United States Patent
Kawabata et al.

(10) Patent No.: US 6,662,713 B2
(45) Date of Patent: Dec. 16, 2003

(54) BINDING APPARATUS WITH A FUSIBLE BAND, AND A DELIVERY SYSTEM INCORPORATING THE SAME

(75) Inventors: Mitsuru Kawabata, Kanagawa (JP); Katsuhisa Sekimoto, Tokyo (JP); Masahiro Morikawa, Kanagawa (JP); Toshikazu Tomo, Kanagawa (JP)

(73) Assignee: Kabushiki Kaisha Tokyo Kikai Seisakusho, Tokyo (JP)

( * ) Notice: Subject to any disclaimer, the term of this patent is extended or adjusted under 35 U.S.C. 154(b) by 0 days.

(21) Appl. No.: 10/270,632

(22) Filed: Oct. 16, 2002

(65) Prior Publication Data
US 2003/0089246 A1 May 15, 2003

(30) Foreign Application Priority Data
Nov. 9, 2001 (JP) ..................... P2001-344464

(51) Int. Cl.$^7$ ..................... B30B 9/30; G05D 15/00
(52) U.S. Cl. ................. 100/4; 100/8; 100/29; 53/589
(58) Field of Search ............... 100/4, 7, 26, 29, 100/32, 33 PB, 8; 53/64, 589, 375.9; 156/73.5, 498, 581, 583.2

(56) References Cited

U.S. PATENT DOCUMENTS

| 3,595,568 A | * 7/1971 | Roskam et al. ............. 271/188 |
| 3,748,207 A | 7/1973 | Campbell et al. |
| 4,155,799 A | * 5/1979 | Matsushita et al. ......... 156/494 |
| 5,442,899 A | * 8/1995 | Shibazaki et al. ............. 53/589 |
| 5,809,873 A | * 9/1998 | Chak et al. ..................... 100/4 |
| 6,050,052 A | * 4/2000 | Herron et al. ................. 53/118 |

FOREIGN PATENT DOCUMENTS

| EP | 0 095 915 | 12/1983 |
| JP | 46-001758 | 1/1971 |
| JP | 46-026480 | 9/1971 |
| JP | 50-002431 | 1/1975 |
| JP | 52-002786 | 1/1977 |
| JP | 04-007043 | 2/1992 |
| JP | 05-045282 | 11/1993 |
| JP | 5-310226 | 11/1993 |
| JP | 2583319 | 8/1998 |
| JP | 2587225 | 10/1998 |
| JP | 2000-177770 | 6/2000 |
| JP | 2000-302104 | 10/2000 |

* cited by examiner

Primary Examiner—Allen Ostrager
Assistant Examiner—Jimmy T Nguyen
(74) Attorney, Agent, or Firm—Rader, Fishman & Grauer PLLC

(57) ABSTRACT

An apparatus to be appended to a rotary printing press for binding successive stacks of printings with a thermally fusible paper band. Included is a band looper for loosely looping the band around a load on a platform. After having been tightened against the load, the band has its lapping parts heated by a band heater into a fused joint and is cut off from its continuous supply. A heater control circuit is provided for causing the band heater to be normally energized for a preassigned period of time at regular intervals during the operation of the apparatus, keeping the heater heated to a temperature necessary for melting the thermoplastic overlay of the paper band. After the heater has heated the band on each load, the heater control circuit causes the heater to be energized for a longer period of time which is enough to compensate for a temperature drop due to the heating of the band.

17 Claims, 12 Drawing Sheets

BINDING APPARATUS WITH A FUSIBLE BAND, AND A DELIVERY SYSTEM INCORPORATING THE SAME

BACKGROUND OF THE INVENTION

1. Field of the Invention

This invention relates to an apparatus for automatically binding any load or pack with a thermally fusible band, preferably a band of paper or like perishable material with a thermally fusible overlay, and more particularly to such an apparatus well calculated to be appended to a rotary printing press for binding successive stacks of printed sheets or signatures, among other applications. The invention also particularly concerns a delivery system of such printed matter or the like incorporating the binding apparatus.

2. Description of the Prior Art

Binding devices using thermally fusible bands are themselves not new but have been known and used for a couple of decades now. Japanese Utility Model Publication No. 46-26480 represents one such conventional device. It comprises a platform or table on which is placed a pack, box, or any other load to be bound. Paid out from its supply reel, a band of fusible plastics material is first loosely looped around the load on the platform and then tightened against the load. Then the band has its lapping parts thermally joined together and is cut off in the neighborhood of the fused joint from its continuous supply.

Both Japanese Patent Publication No. 50-2431 and Utility Model Publication No. 52-2786 suggest delivery systems, with conveyors both upstream and downstream of a binding station of largely foregoing construction. Japanese Patent Publication No. 46-1758, Utility Model Publication No. 4-7043, and Utility Models Nos. 2583319 and 2587225 are hereby cited as each teaching one or more of: (a) a pen for temporary storage of a length of band on its way from supply to binding station; (b) a mechanism for switching the band from one supply reel to another; and (c) a mechanism for swift discharge of the remaining length of old band from the band path around the platform preparatory to band switching from one reel to the other.

All the foregoing citations presuppose use of polypropylene or like fusible plastics bands. More recently, with increasing public awareness of global environment, fusible paper bands have been suggested by Japanese Unexamined Patent Publication No. 2000-177770 for use in substitution for more conventional fusible plastics bands which are nonperishable. By "fusible paper bands" are meant the bands of paper with an overlay of a thermoplastic vinyl adhesive. Lapping parts of each length of such fusible paper band are heated under pressure until they are joined together by the fusion of the thermoplastic overlay.

Japanese Unexamined Patent Publication No. 2000-302104 is a response to this suggestion, teaching a binding device using fusible paper bands. This prior art device represents no substantive improvement over the more conventional ones except for the proposed limitations in temperature, pressure, and heating time to be conformed to in splicing the ends of each length of band.

Fusible paper bands by reason of their makeup demand some extra considerations in use. Creation of fused joints of such bands require relatively large amounts of a thermoplastic vinyl adhesive and, in consequence, correspondingly large quantities of heat, even though the adhesive itself need not be heated to very high temperatures for melting. The heater temperature has therefore been easy to drop greatly each time a fused joint is created. Improper joints have indeed occurred on account of insufficient heater temperature, and hence insufficient melting of the adhesive, in cases where a number of loads are bound in rapid succession, as in newspaper production.

Japanese Utility Model Publication No. 5-45282 teaches to control the magnitude of the electric current energizing the band heater in order to keep the heater temperature constant. This known control system is designed to maintain the heater temperature in the face of variations in the temperature of the environment. The utility model is silent on how to swiftly recover the heater temperature from a drop due to the heating of the fusible paper band.

There are some additional considerations that must be taken into account in use of fusible paper bands. These bands must of necessity be thicker than polypropylene bands for a given degree of strength. For this reason, combined with the presence of the fusible overlay thereon, fusible paper bands are less supple, more rigid, than their plastics counterparts. A further inconvenience is that their surfaces are high in coefficient of friction. All these factors combine to make it difficult for them to travel smoothly along the band guideways in the binding apparatus.

As an additional inconvenience, the thermoplastic overlay on the paper band is easy to come off and adhere to the surfaces defining the band path. Particularly objectionable is the accumulation of the thermoplastic material on the surfaces of the rollers by which the band is fed toward, or pulled back from, the binding station. A slip has actually occurred between the rollers and the band, making it difficult, and even impossible, to feed or tighten the band.

SUMMARY OF THE INVENTION

The present invention seeks to expedite the binding of successive loads with fusible paper bands, in particular, through controlled energization of the heater during the operation of the apparatus.

Another object of the invention is to assure smooth travel, either forward or backward, of the fusible paper band along the predefined path from the infeed to the binding station.

A still another object of the invention is to provide a delivery system for newspapers or other loads incorporating the binding apparatus of the above improved constructional and operational characteristics.

Stated in brief, the present invention concerns an apparatus for binding a succession of loads such as stacks of printings with a thermally fusible band. Included is a band looper for loosely looping a band, which is fed continuously from its supply means, around a load so as to provide lapping parts of the band. A band heater is provided for heating the lapping parts of the band for uniting the same into a fused joint after the band has been tightened against the load. The heater is under the control of heater control means whereby the heater is normally energized for a first preassigned period of time at constant intervals during the operation of the apparatus, and at least for a second preassigned period of time, which is longer than the first, in response to the actual heating of the band around each load, after the fusion jointing, in order to compensate for a temperature drop that might occur as a result of heating the band.

Preferably, the heater control means is responsive to a band fusion signal which commands the travel of the band heater to and away from a position for heating the band. Irrespective of being held away from or near the heating position, the heater is intermittently energized for the first preassigned period of time in order to be held at a temperature capable of creating a fused joint for the band. Then, after the band fusion signal is output to dictate the travel of the heater to the heating position, the heater is subsequently energized long enough to have its temperature raised up to approximately the band fusion temperature after the heating of the band.

Experiment has proved that the present invention makes it possible to swiftly recover the heater from an undesired temperature drop due to the heating of the band around each load. The band in use may be either a fusible paper band or any other type of fusible band. With the heater so subjected to a compensatory reheating for each load, any known types of fusible bands can be fused more quickly than heretofore for more efficient binding of the successive loads.

Another aspect of the invention concerns a more comprehensive aspect of the binding apparatus, comprising a platform to which loads to be bound are conveyed one after another, band looper means for loosely looping and releasably holding a thermally fusible band around the load on the platform so as to provide lapping parts of the band, feed means for feeding the band from its continuous supply means to the band looper means, pullback means for pulling back the band that has been loosely looped around the load and which has been released from the band looper means, tightening means for tightening the band against the load, a heater for movable into and out of a space between the lapping parts of the tightened band and hence for thermally uniting them into a fused joint, and cutter means for cutting the band that has been bound around each load, off from the continuous supply means. A heater control means is provided for causing the heater to be normally energized for a first preassigned period of time at constant intervals throughout the course of binding the load and, in response to a band fusion signal commanding the heater to heat the lapping parts of the tightened band into a fused joint, after the fusion jointing, for causing the heater to be energized for at least a second preassigned period of time which is longer than the first, in order to compensate for a temperature drop that might occur as a result of heating the band.

The rollers included in the feed means and the pullback means are provided with doctor blades for making their surfaces clean of the adhesive matter that may adhere thereto from the fusible band. A tightening roller, moreover, which is capable of rotation only in the direction for tightening the band against the load, is provided with means for application of a forced airstream to its surface in order to lessen frictional contact thereof with the remaining length of the band being rapidly withdrawn from the binding apparatus at the time of switching from one band supply reel to another. All these means combine to make the travel, either forward or backward, of the thermally fusible band of any known or suitable type smoother.

The binding apparatus according to the invention may most advantageously be incorporated in a delivery system of, for example, printings from a rotary printing press to a location of shipment such as a truck yard. Such a delivery system may include a stacking station where each preselected number of printings are stacked up. Positioned downstream of the stacking station, a binding station may be constructed as taught by the invention, for binding the successive stacks of printings with a thermally fusible band. Since the stacks can be bound at the binding station far more efficiently than heretofore, such stacks may be formed and delivered to the binding station at a higher rate without the risk of their being held standing by upstream of the binding station.

The above and other objects, features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

General

Figure 1:
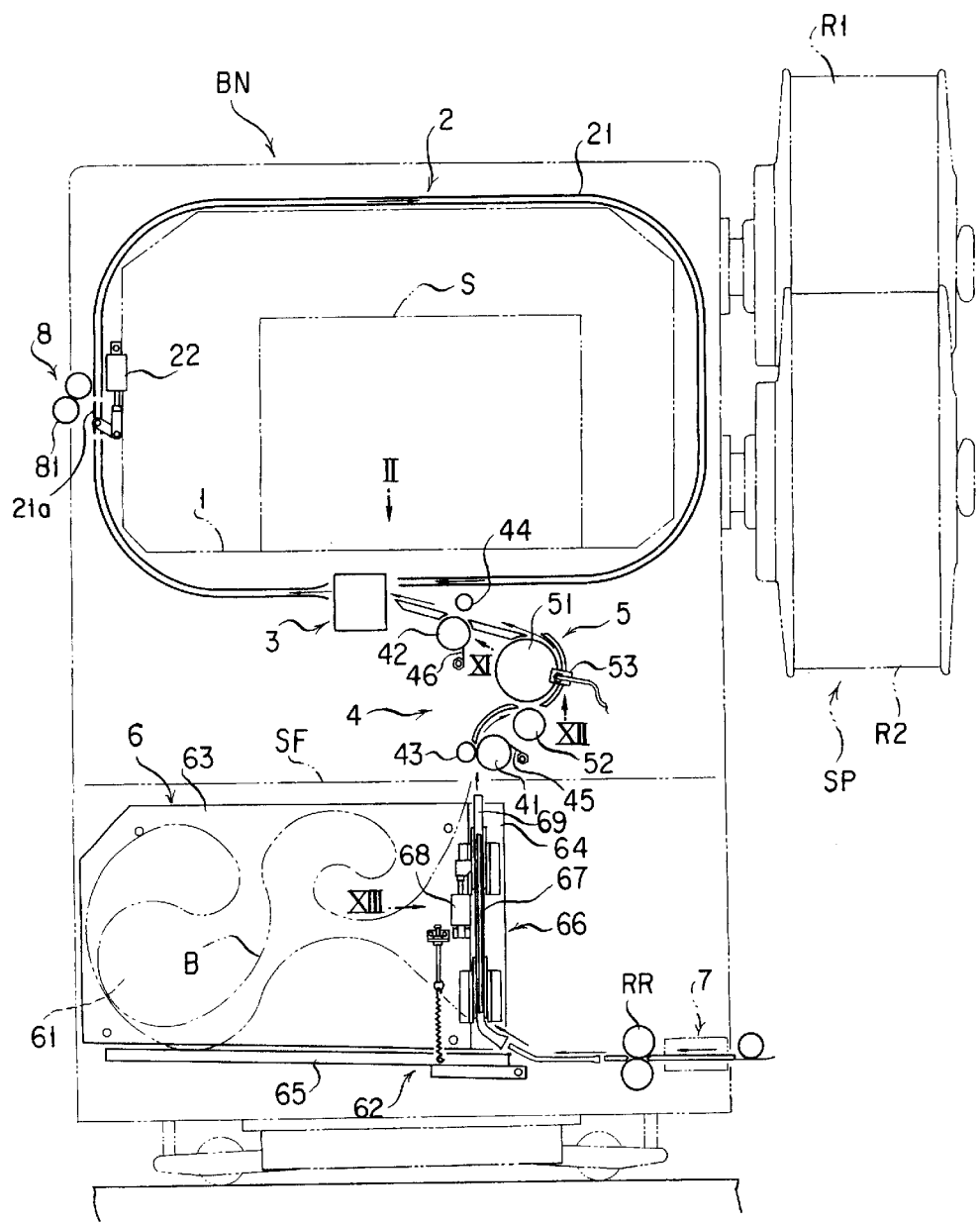
FIG. 1 is a diagrammatic elevational view of a preferred form of binding apparatus according to the present invention.

The present invention will now be described more specifically as adapted for use as an appendage to a rotary printing press for newspaper production, in order to bind successive stacks of printed sheets or signatures with fusible paper bands for delivery. FIG. 1 is an illustration of the binding apparatus so adapted. Generally labeled BN, the binding apparatus includes a platform 1, shown also in FIG. 2, on which each stack S of printed and folded signatures are to be bound. The platform 1 has a slot 13 cut transversely therein for the passage of a fusible paper band B in binding the stack S.

The reference numeral 2 generally denotes a band looper providing a guideway for forming the band B into a loop surrounding the platform 1 and the stack S thereon with substantial clearance preparatory to the binding of the stack. The band looper 2 has an entrance end and an exit end, with a spacing therebetween, under the platform 1, where each predetermined length of the band B is to be spliced end to end and cut off from its continuous supply from a supply station SP.

Splicer/cutter means 3 are provided under the platform 1 and between the open ends of the band looper 2, as illustrated in more detail in FIGS. 3–8. The band B is to be looped by the band looper 2 until its leading end laps a prescribed length over its trailing end. After the band has been tightened around the stack S by means to be set forth presently, the splicer/cutter means 3 will operate to fuse the lapping ends of the band under pressure and to cut the band immediately upstream of the fused joint with respect to the arrow-marked forward traveling direction of the band B.

Figure 5:
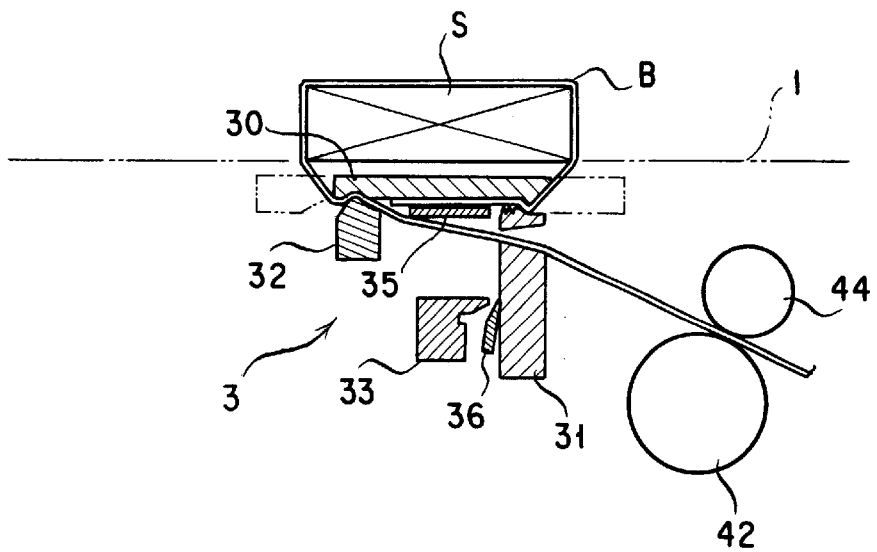
FIG. 5 is also an illustration similar to FIG. 3 but showing a third step of binding operation.
Figure 6:
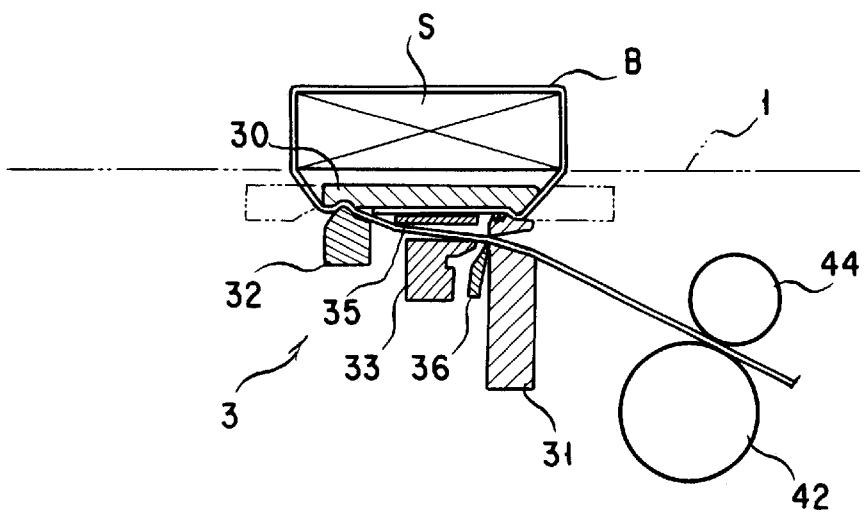
FIG. 6 is also an illustration similar to FIG. 3 but showing a fourth step of binding operation.

The splicer/cutter means 3 include a band heater 35, FIGS. 5 and 6, for use in uniting the lapping ends of each length of band around the stack S as above. As illustrated block-diagrammatically in FIG. 9, a heater control circuit 37 is provided which operates as in the waveform diagram of FIG. 10 for automatically controlling the temperature of the band heater 35 in accordance with the novel concepts of this invention.

Lying immediately upstream of the splicer/cutter means 3 are feed/pullback means 4 including a feed roller 41 for feeding each predetermined length of the band B toward the band looper 2. The feed/pullback means 4 also include a pullback roller 42 for pulling back the band B after it has been looped and had its leading end engaged by the splicer/cutter means 3. This pullback of the band is in preparation to the subsequent tightening thereof against the stack S.

Tightening means 5 are provided intermediate the feed roller 41 and the pullback roller 42 for tightening the looped band B against the stack S after it has been pulled back as above by the pullback roller 42.

Seen at 6 is a band pen for temporarily storing each predetermined length of the band B in a randomly meandering state preliminary to delivery to the band lopper 2 as the band is paid out from its supply station SP. The band pen 6 also receives the band as the latter is pulled back by the pullback roller 42 and tightened by the tightening means 5.

It will be observed from FIG. 1 that two band reels $R_1$ and $R_2$ are provided at the supply station SP for uninterrupted band supply. Switching means are provided at 7 for switching from one band reel to the other when that first band reel is used up.

At the time of switching from one to the other of the reels $R_1$ and $R_2$, the need will arise for withdrawal of the remaining length of old band upon detection of its trailing end in a manner to be detailed subsequently. The band looper 2 is therefore provided with rapid withdrawal means 8 for rapid withdrawal and discharge of the remaining old band from the band pen 6 and the band path downstream of the band pen.

Hereinafter in this specification the above noted platform 1, band looper 2, splicer/cutter means 3, band heater control circuit 37, feed/pullback means 4, tightening means 5, band pen 6, switching means 7, and rapid withdrawal means 8 will be discussed in more detail, in that order and under separate headings. Operational description will follow the discussion of the listed components.

Platform

Figure 2:
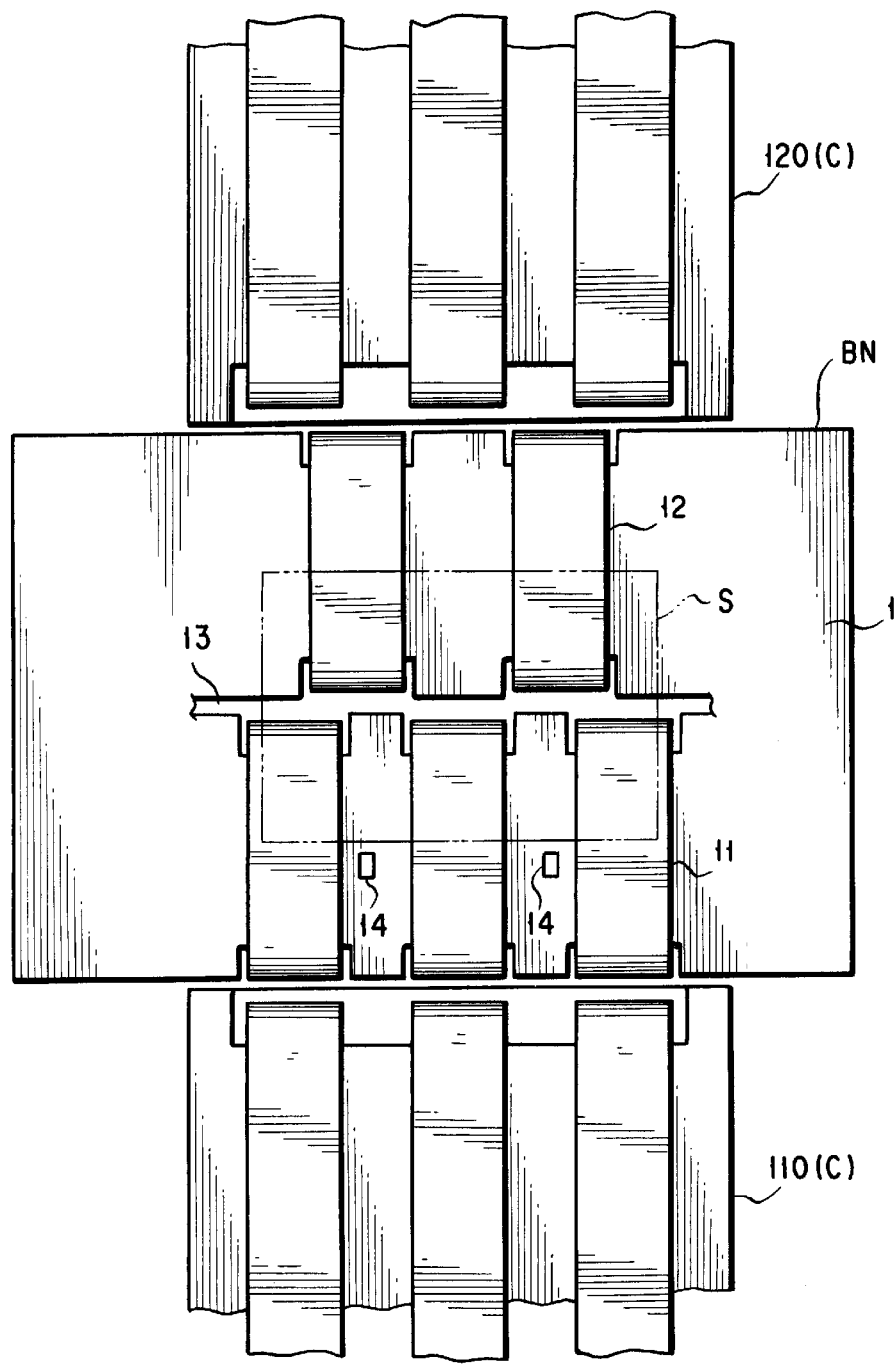
FIG. 2 is an enlarged, fragmentary plan view of the binding apparatus as seen in the direction of the arrow II in FIG. 1, the view showing in particular the platform on which stacks of printings are bound one after another.

As illustrated on an enlarged scale in FIG. 2, the platform 1 is provided with a carrying-in conveyor 11 and a carrying-out conveyor 12 which are both arranged horizontally in coplanar relationship and in line with each other. The two conveyors 11 and 12 are arranged end to end with a spacing therebetween in register with the slot 13, and with their top flights approximately flush with the platform surface. The carrying-in conveyor 11 has its upstream end joined to a delivery conveyor 110 for receiving the successive stacks from its manufacturing stations. Each stack is to be bound while being positioned centrally on and between carrying-in conveyor 11 and carrying-out conveyor 12, as indicated in phantom outline in this figure. The carrying-out conveyor 12 has its downstream end joined to another delivery conveyor 120 for carrying the bound stack from the platform 1 toward a place of shipment. Both delivery conveyors 110 and 120 constitute parts of the delivery system to be disclosed later in this specification.
fication.

Band Looper

With reference back to FIG. 1 the band looper 2 includes an annular band guide/holder structure 21 capable of guiding the band B along the looping path as the band is fed forwardly by the feed roller 41 and of holding the band looped around the stack S before being tightened against the same. The band guide/holder structure 21 has both of its band entrance end and band exit end disposed under the platform 1, with a spacing between the two ends in a direction parallel to the surface of the platform and with an offset therebetween in a direction perpendicular to the surface of the platform.

In order to permit the band B to be tightened against the stack S, the band guide/holder structure 21 is wholly movable in a direction parallel to the traveling direction of each stack onto and away from the platform 1, between a working and a retracted position. The band B being held by the guide/holder structure 21 is in register with the slot 13, FIG. 2, in the platform 1 when the structure is in the working position. Upon retraction of the guide/holder structure 21, then, the band is released sideways therefrom onto the stack S.

A part $21_a$ of the guide/holder structure 21 is made pivotable by an actuator 22 in order to be directed outwardly of the loop for unloading the remaining old band from the binding apparatus BN when each band reel $R_1$ or $R_2$ is used up. More will be said presently on this subject in conjunction with the rapid band withdrawal means 8.

Splicer/Cutter Means

Indicated as a simple block in FIG. 1, the splicer/cutter means 3 are shown in more detail and in sequential steps of operation in FIGS. 3–8. Included is an abutment 30 movable between a working position, in which it closes the midpart of the slot 13 in the platform 1, and a retracted position in which it thoroughly opens the platform slot. Under the abutment 30 when it is in the working position there are provided: (a) a first or band-leading-end push member 31 for engaging the band B against the abutment 30 in a position adjacent its leading end; (b) a second or band-trailing-end push member 32 for engaging the band B against the abutment 30 in a position adjacent the trailing end of each length of the band around the stack S; (c) a third or band-lapping-parts push member 33 for pushing the lapping end portions of the length of the band against the abutment 30 for creation of a fused joint; (d) a dual guide unit 34 for guiding the leading end of each length of the band B into overlapping relationship to its trailing end; (e) the aforesaid band heater 35 for heating the lapping end parts of each band length for melting the thermoplastic overlay thereon; and (f) a cutter 36 for cutting the band B into the required length after it has bound the stack S. All these components of the splicer/cutter means 3 are movable independently of one another to perform the various functions which will become more apparent as the description proceeds.

Figure 3:
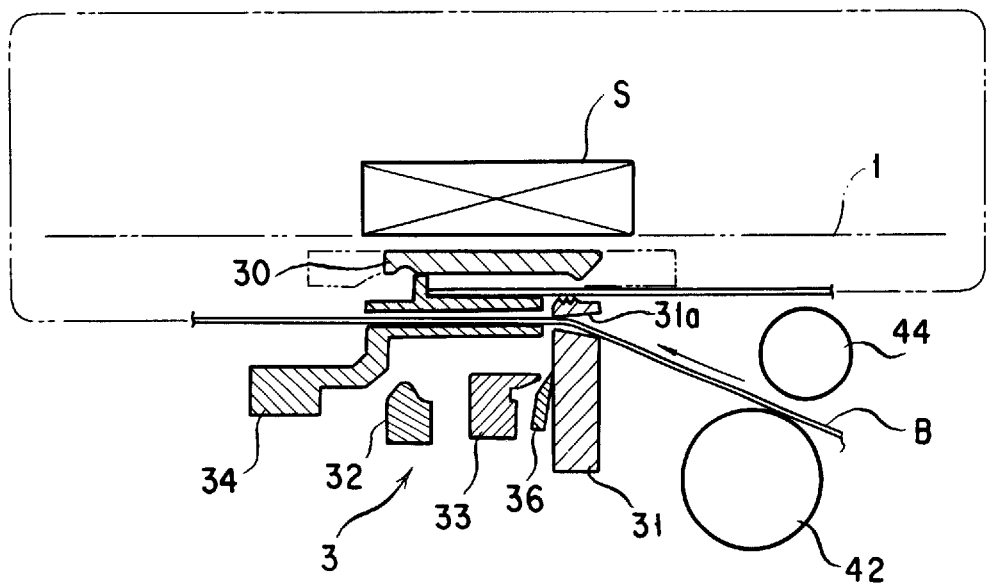
FIG. 3 is a diagrammatic illustration showing a thermally fusible band loosely looped around a stack on the FIG. 2 platform in the FIG. 1 apparatus as a first step of binding operation.

The band-leading-end push member 31 has an additional function as guide, having a guide hole $31_a$ formed therethrough for the passage of the band B before it is looped around the platform 1. On issuing from the guide hole $31_a$, the band B is to be guided by the dual guide unit 34 into the entrance end of the guide/holder structure 21, FIG. 1, of the band looper 2, as depicted in FIG. 3. Further, on subsequently emerging from the exit end of the guide/holder structure 21 under the abutment 30, the band B is to be guided again by the dual guide unit 34 into overlapping relationship to the trailing end portion of the band, as shown also in FIG. 3. The band-leading-end push member 31 is movable into and out of engagement with the abutment 30 via the band B. As the band emerges as above from the exit end of the guide/holder structure 21, the band-leading-end push member 31 frictionally engages the band against the abutment 30, as in FIG. 4, in a position somewhat downstream of its leading end. Like the abutment 30 the dual guide unit 34 is also movable into and out of register with the slot 13 in the platform 1.

The band-trailing-end push member 32 is likewise movable into and out of engagement with the abutment 30 to frictionally capture the band B against the abutment. After the dual guide unit 34 has moved out of register with the platform slot 13, the band-trailing-end push member 32 is to be thrust to push the band B against the abutment 30 in a position spaced upstream from what is to become the trailing end of one band length as the latter is subsequently cut off from the rest of the band by the cutter 36.

FIG. 5 indicates the band-trailing-end push member 32 thus pushing the band B against the abutment 30. It will be observed from this figure that the band B has lapping parts between the two push members 31 and 32 by which it is frictionally caught against the abutment 30. The heater 35 is movable into the space between these lapping parts of the band B for melting the thermoplastic overlay thereon.

Figure 7:
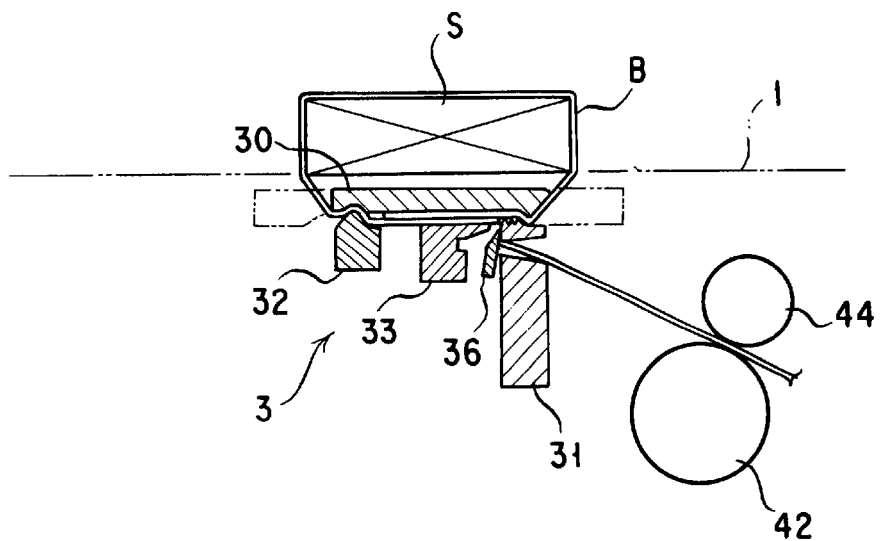
FIG. 7 is also an illustration similar to FIG. 3 but showing a fifth step of binding operation.
Figure 8:
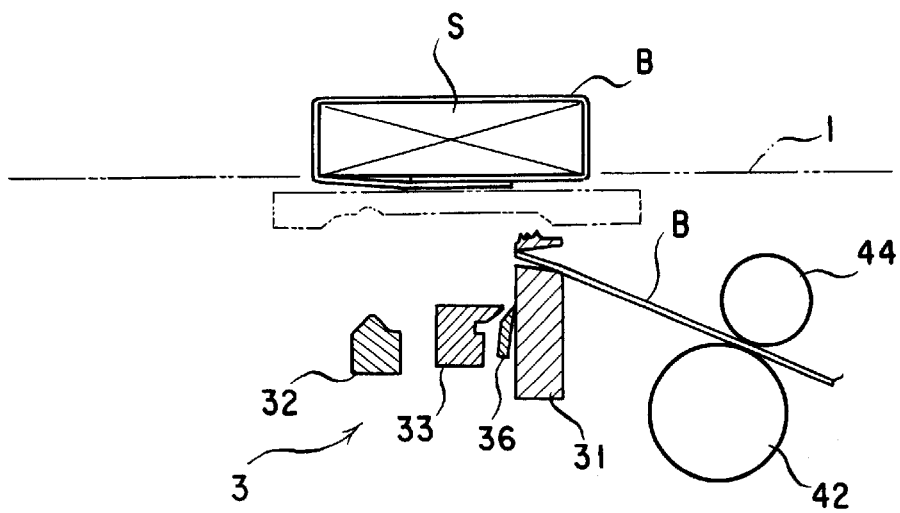
FIG. 8 is also an illustration similar to FIG. 3 but showing a sixth step of binding operation.

As will be understood from FIGS. 6–8, the band-lapping-parts push member 33 is to push the lapping parts of the band against the abutment 30 for creation of a fused joint following the withdrawal of the heater 35 from between the lapping parts. The cutter 36 is therein shown cutting the band B in a position just downstream of the fused joint.

It is understood that drive means are coupled to all these movable parts of the splicer/cutter means 3 in order to actuate them in a prescribed sequence to be detailed later. Such drive means are not shown because they fall outside the purview of the instant invention.

Band Heater Control Circuit

Figure 9:
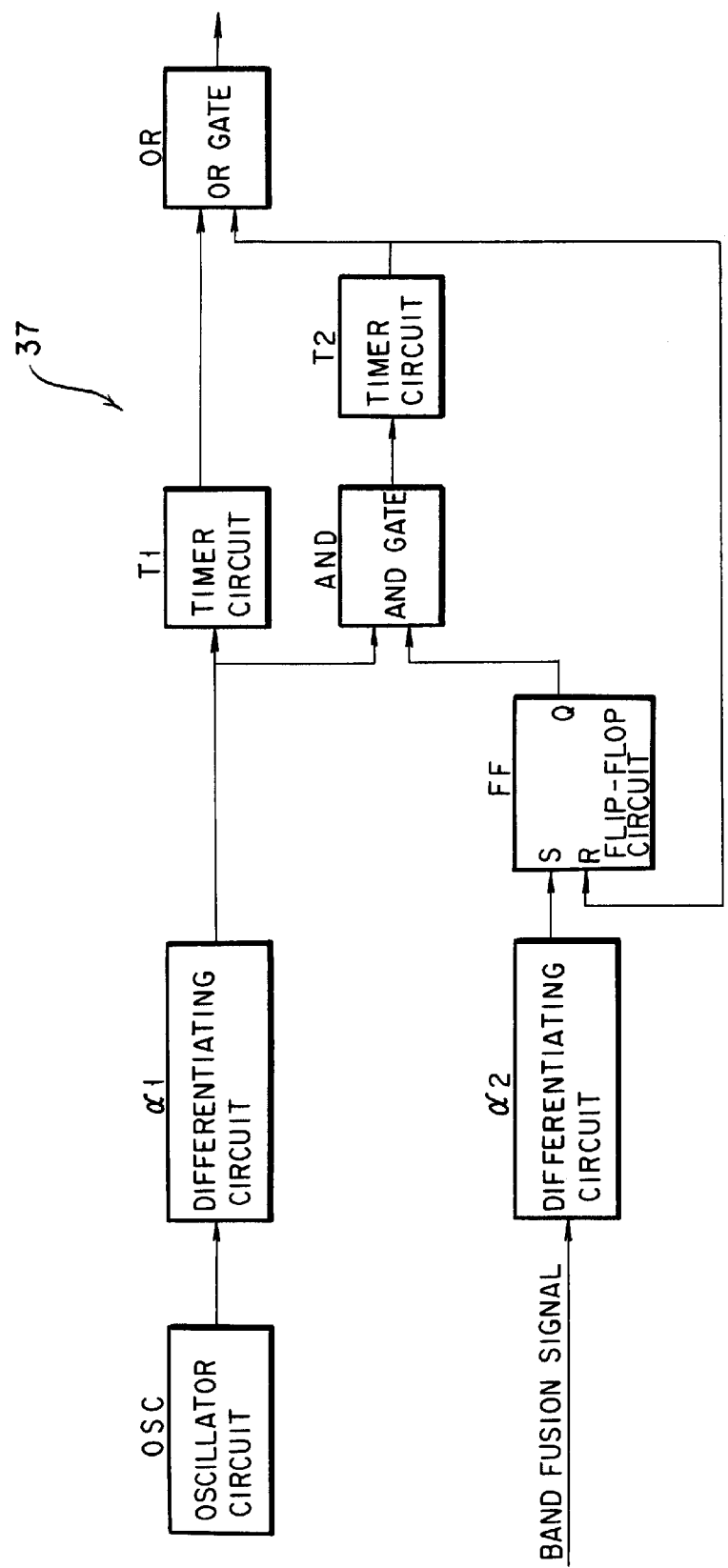
FIG. 9 is a block diagram of a band heater control circuit of the FIG. 1 apparatus.
Figure 10:
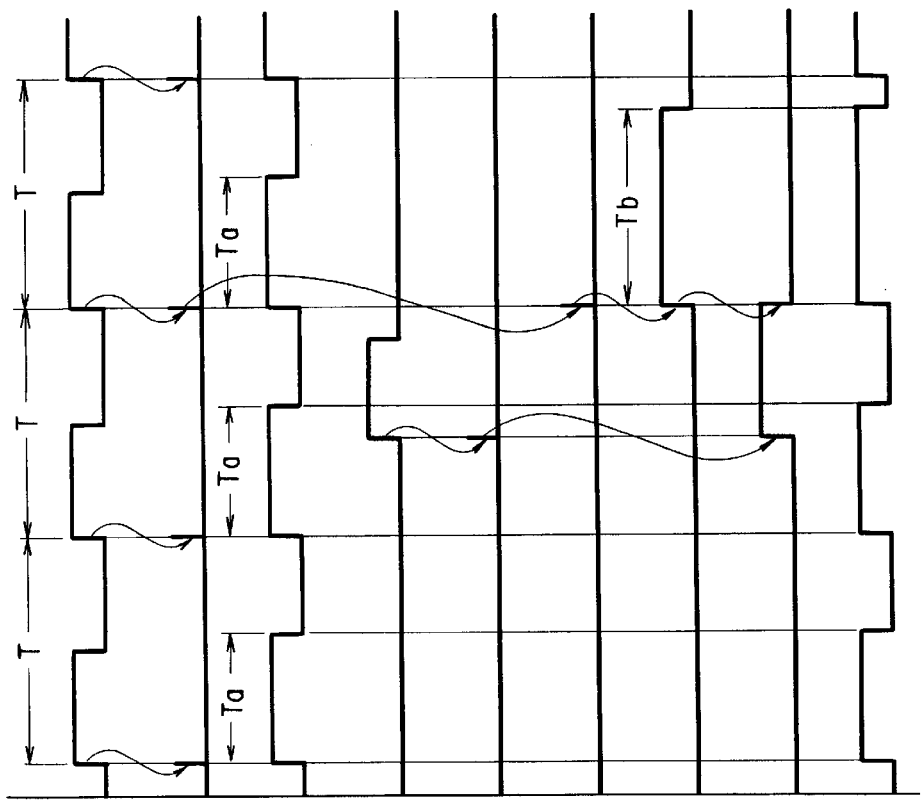
FIG. 10 is a diagram of signal waveforms appearing in the various parts of the FIG. 9 heater control circuit.

Reference may be had to both FIGS. 9 and 10 for a study of the band heater control circuit 37 by which the band heater 35 of the splicer/cutter means 3 is automatically heated to optimal temperatures for creation of fused joints for the bands that have been bound around the successive stacks S. The heater control circuit 37 includes an oscillator circuit OSC generates a signal that alternately goes high and low with a constant cycle T. Inputting this output from the oscillator circuit OSC, a first differentiating circuit $a_1$ puts out a series of trigger pulses in synchronism with the leading edges of the oscillator output pulses, for delivery to both a first timer circuit $T_1$ and an AND gate AND. In response to each trigger pulse from the first differentiating circuit $a_1$, the first timer circuit $T_1$ puts out a pulse with a preassigned duration $T_a$ which is less than the cycle T of the oscillator output signal.

The heater control circuit 37 further includes a second differentiating circuit $a_2$ to which is supplied a band fusion signal commanding the band heater 35, FIGS. 5 and 6, to move into and out of the space between the lapping parts of the band that has been tightened against the stack S. The second differentiating circuit $a_2$ puts out a trigger pulse when the band fusion signal goes high to command the travel of the heater 35 into the space between the lapping parts of the band for heating them into a fused joint. A flip-flop circuit FF has a set input S connected to the second differentiating circuit $a_2$, a reset input R connected to a second timer circuit $T_2$ yet to be described, and a noninverting output Q connected to the AND gate AND. Thus the Q output from the flip-flop circuit FF goes high in response to the trigger pulse from the second differentiating circuit $a_2$, and low in response to the rise of each output pulse of the second timer circuit $T_2$.

It is now seen that the AND gate AND goes high only when a trigger pulse from the first differentiating circuit $a_1$ is supplied during a high state of the Q output from the flip-flop circuit FF. Triggered by the output from the AND gate AND, the second timer circuit $T_2$ provides a pulse having a preassigned duration $T_b$ which is longer than the output pulse duration $T_a$ of the first timer circuit $T_1$.

The two timer circuits $T_1$ and $T_2$ are both connected to an OR gate OR. This OR gate therefore produces pulses of both durations $T_a$ and $T_b$ as in FIG. 10. The heater 35 is energized during the high states of the output from the OR gate OR.

As long as the band fusion signal remains low, the OR gate OR will put out the pulses of the shorter duration $T_a$, causing the heater 35 to be energized for $T_a$ periods at regular intervals to be held heated to a predetermined standby temperature. However, after the band fusion signal is output, the OR gate OR will put out a pulse of the longer duration $T_b$ which rises in synchronism with the rise of the first subsequently produced output pulse of the oscillator OSC. The heater 35 will then be energized for this longer period $T_b$ and so heated back to the prescribed band fusion temperature in the face of a temperature drop due to the heating of the band.

Each first preassigned energization period $T_a$ is determinable by the first timer circuit $T_1$. The intervals at which the heater 35 is energized depend upon the difference between the cycle T of the oscillator OSC and the output pulse duration $T_a$ of the first timer circuit $T_1$. Each second preassigned energization period $T_b$, on the other hand, can be preset by the second timer circuit $T_2$. Notwithstanding the showing of FIG. 10, however, the second preassigned energization period $T_b$ can be made longer than the oscillator cycle T. In that case the heater 35 will be energized for a variable period of time which may be the sum of $T_a$ and $T_b$ at the longest; that is, $$T_b < T_c \leq T_a + T_b$$

where $T_c$ is the variable period of time during which the heater 35 is energized when the second preassigned energization period $T_b$ is longer then the oscillator cycle T.

The FIG. 9 circuitry represents only an example of heater control means according to the invention. Another possible example is a central processor unit preprogrammed in conformity with the showing of FIG. 10.

Feed/Pullback Means

Figure 11:
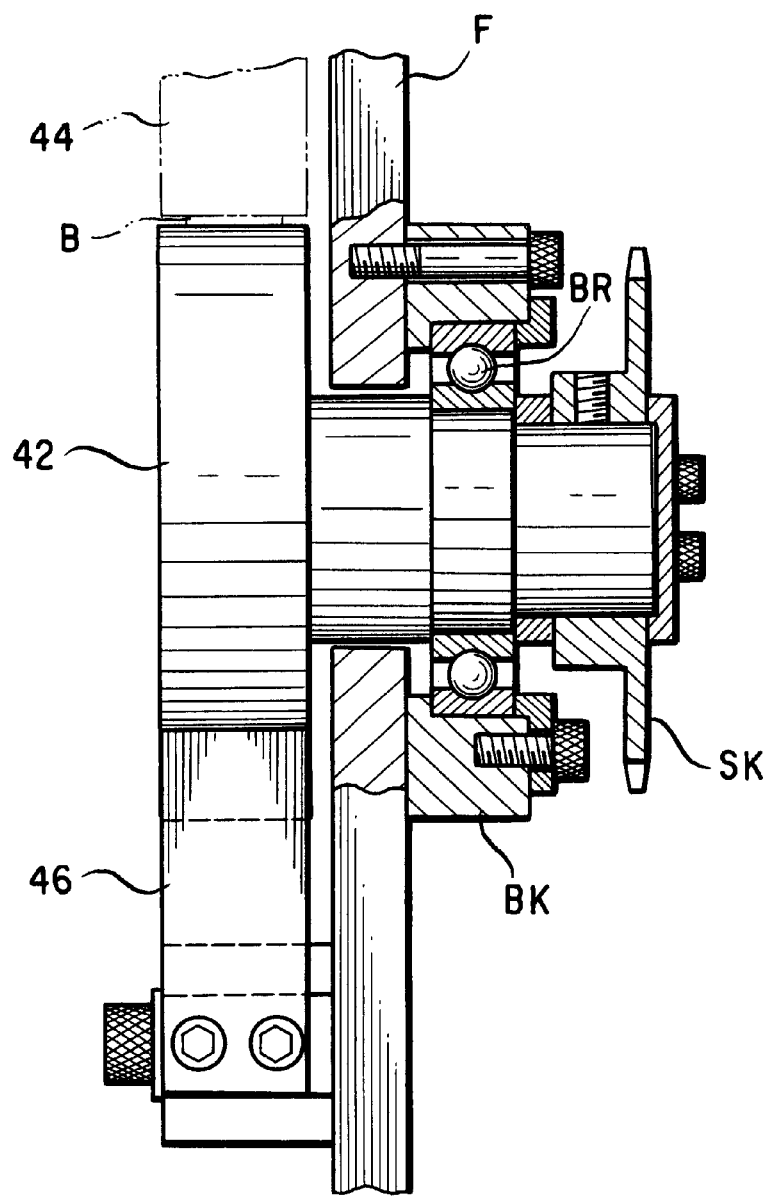
FIG. 11 is an enlarged, fragmentary view showing, partly in elevation and partly in axial section, the pullback roller and associated doctor blade of the binding apparatus as seen in the direction of the arrow XI in FIG. 1.

Referring to FIG. 1 again, the feed/pullback means 4 include the noted feed roller 41 disposed immediately downstream of the band pen 6, and the noted pullback roller 42 disposed immediately upstream of the splicer/cuter means 3. As illustrated on an enlarged scale in FIG. 11, the pullback roller 42 is rotatably mounted to a framing wall F via a bearing BR and a bearing holder BK and is driven by means including a sprocket wheel SK. It is understood that the feed roller 41 is mounted likewise and driven likewise.

The feed roller 41 rotates clockwise, as viewed in FIG. 1, for feeding the band B. A nip roller 43 is movable into and out of rolling contact with the feed roller 41 via the band B for feeding the same in coaction therewith. A doctor blade 45 is held against the surface of the feed roller 41 for scraping the same, during its rotation in the band-feeding direction, clean of the thermoplastic adhesive that may adhere thereto from the fusible paper band B.

The pullback roller 42 rotates clockwise, as viewed in FIG. 1, for frictionally causing the band B to travel in a direction opposite to that in which it is fed by the feed roller 41. A nip roller 44 is movable into and out of rolling contact with the pullback roller 42 via the band B for pulling the same back in coaction therewith. The pullback roller 42 is also provided with a doctor blade 46 thereby to have its surface scraped, during its rotation in the band pullback direction, clean of the fusible matter that may attach thereto from the band B.

Tightening Means

With continued reference to FIG. 1 the tightening means 5 include a tightening roller 51 lying between feed roller 41 and pullback roller 42, in such a position that the band B is wrapped around the tightening roller a sufficient angle for the purposes hereinafter made apparent. The tightening roller 51 is greater in diameter than the feed roller 41 or the pullback roller 42 and has its surface made from a material that is relatively high in coefficient of friction. It is understood that the tightening roller 51 is constrained by a one-way clutch, not shown, to rotation only in a direction (clockwise as viewed in FIG. 1) opposite to that in which the band is fed by the feed roller 41. A nip roller is provided at 52 for movement into and out of rolling contact with the tightening roller 51 via the band B.

Figure 12:
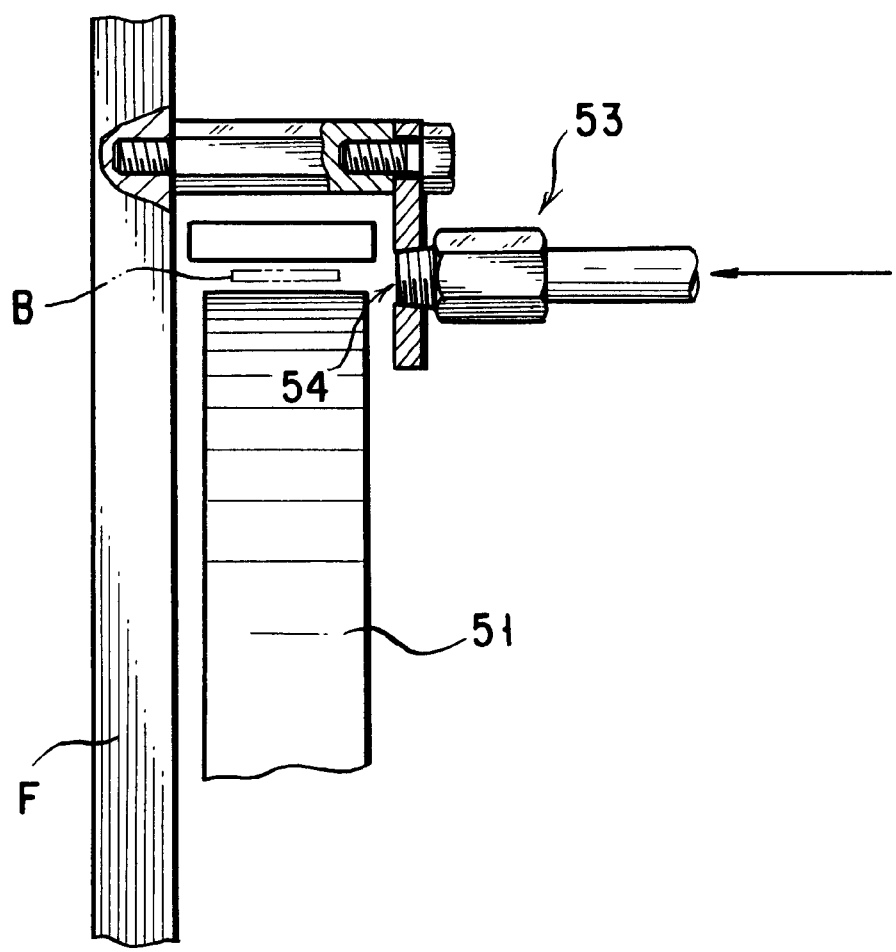
FIG. 12 is an enlarged, fragmentary view showing, partly in elevation and partly in section, the tightening roller and associated air blow means of the binding apparatus as seen in the direction of the arrow XII in FIG. 1.

As indicated at 53 in FIG. 1 and in more detail in FIG. 12, air blow means are provided which include a spout or nozzle 54 for applying a forced stream of air to the surface of the tightening roller 51 in a direction parallel to the roller axis and in a position approximately in the middle of its part enwrapped by the band B. The nozzle 54 communicates with a source of air under pressure, not shown, via a conduit system with a valve, also not shown.

The tightening roller 51 is locked as aforesaid against rotation in the forward traveling direction of the band. Therefore, were it not for the air blow means 53, the band would have to travel in inconveniently great frictional engagement with the tightening roller 51 while being rapidly withdrawn from this binding apparatus at the time of switching from one band reel to another. The forced airstream from the nozzle 54 is intended to alleviate such braking of the band being withdrawn by the tightening roller 51.

Band Pen

As will be noted from FIG. 1, the band pen 6 lies downstream of a pair of band supply rollers RR by which the band B is supplied from the successive band reels $R_1$ and $R_2$. The band pen 6 provides a confined space 61 for storing the band B in random meander. As shown also in FIGS. 13 and 14, the band pen 6 has a pair of upstanding, confronting walls 63 and 64 bounding the opposite sides of the band storage space 61. The pair of side walls 63 and 64 are spaced from each other a distance just enough to receive the band B. The end of the band pen 6 opposite the pair of band supply rollers RR, shown directed to the right in FIG. 1, is openably closed by gate/guide means 66 to be detailed later with reference to FIGS. 13 and 14. The top of the band pen is partitioned off at SF from the space for accommodating the unshown means for driving the splicer/cutter means 3, feed/pullout means 4, tightening means 5, and so forth.

The band pen 6 has band-weighing means 62 for measuring the band B in terms of weight so that each approximately predetermined length of the band may be stored in the pen. The weighing means 62 include a weighing platform 65 pivotally mounted at the bottom of the band pen 6. Normally sprung to the closed position as depicted in FIG. 1, the weighing platform or bottom 65 is to pivot downwardly to actuate a limit switch, not shown, when the band is introduced into the pen 6 to a prescribed weight.

Figure 13:
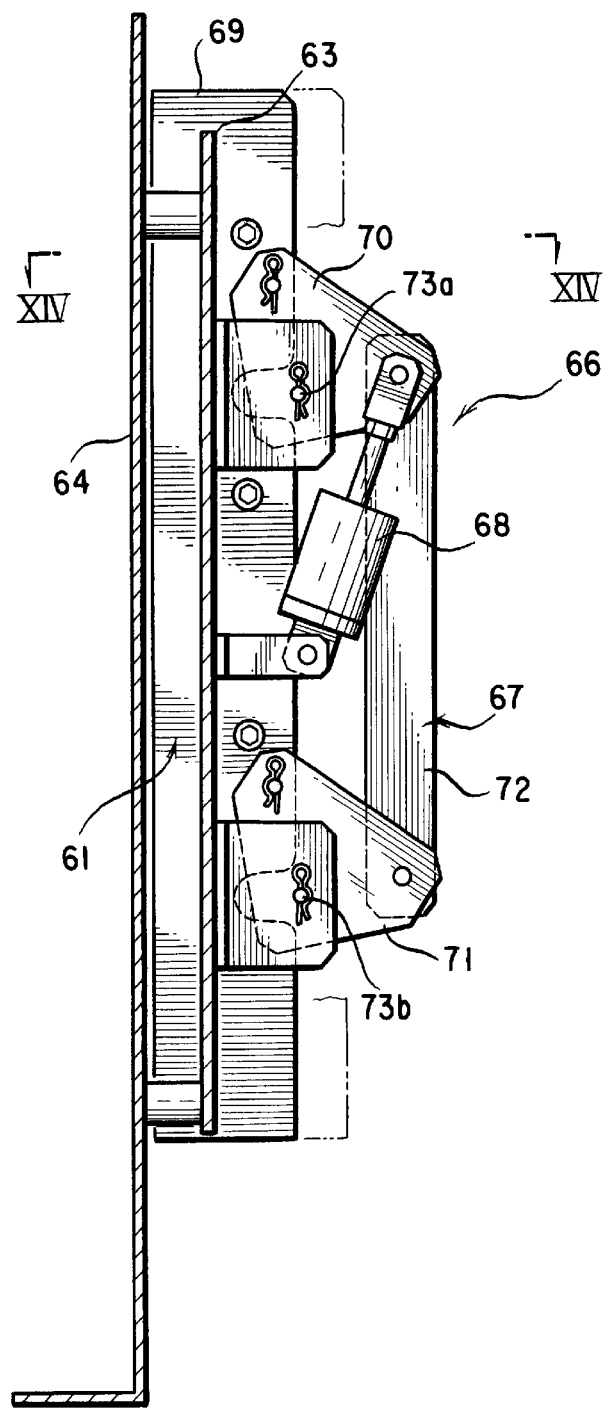
FIG. 13 is an enlarged, fragmentary view of the parallelogram linkage of the binding apparatus as seen in the direction of the arrow XIII in FIG. 1.
Figure 14:
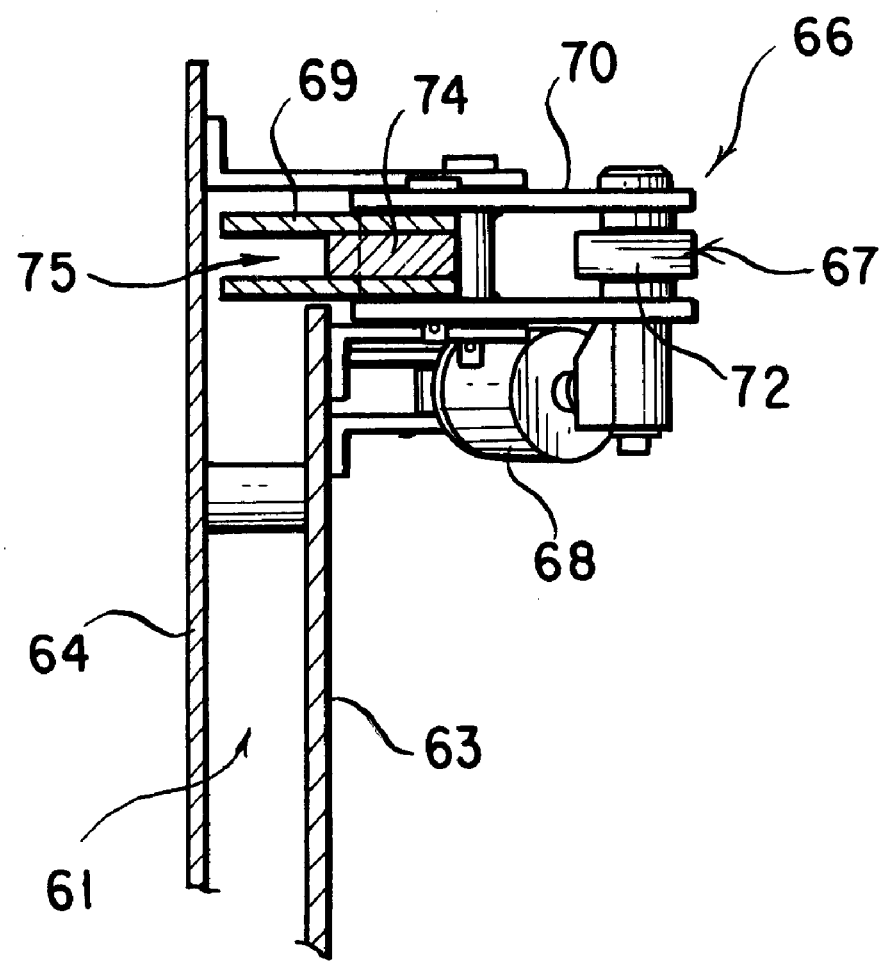
FIG. 14 is a section taken along the line XIV—XIV in FIG. 13.

A consideration of FIGS. 13 and 14 taken together with FIG. 1 will make clear that the noted gate/guide means 66 include a gate/guide structure 69 which performs the dual purpose of openably closing the right-hand end, as seen in FIG. 1, of the band pen 6 and providing a bypass for the band B around the pen. The gate/guide structure 69 is constituted of a pair of parallel side walls with a spacer 74 therebetween to provide a bypass guideway 75 which is open at both top and bottom ends as well as laterally toward the side wall 64 of the band pen 6.

In order to cause the gate/guide structure 69 to open and close the band pen 6 by moving toward and away from the band pen side wall 64, there is provided a parallelogram linkage 67, best seen in FIG. 13, of which the gate/guide structure 69 forms a part. The parallelogram linkage 67 additionally comprises links 70, 71 and 72 which are pin jointed to one another and to the gate/guide structure 69. The links 70 and 71 are additionally pin jointed at $73_a$ and $73_b$ to mounting lugs on the band pen side walls 63 and 64. Therefore, with the extension and contraction of a fluid-actuated cylinder 68, the gate/guide structure 69 is movable between the closed position indicated by the solid lines in both FIGS. 13 and 14 and the open position indicated in phantom outline in FIG. 13.

FIG. 1 shows that the gate/guide structure 69 has its bottom end portion curved toward the pair of band supply rollers RR. The band B that has been fed from its supply station SP by these rollers RR is to enter the bypass 75 in the gate/guide structure 69, thereby to be guided upwardly, when the gate/guide structure is in the solid-line closed position of FIG. 13. When the gate/guide structure 69 is in the phantom open position, on the other hand, the band B is to be allowed into the pen 6. Normally, the gate/guide structure 69 keeps the band pen 6 open. The band pen is to be closed for guiding the leading end of the band up through the bypass 75 to the feed roller 41, as just after new band reels are installed as at $R_1$ and $R_2$ in FIG. 1 or when the band is switched from one reel to the next.

Switching Means

The switching means 7 are not shown in detail as they fall outside the scope of this invention. An explanation of their functions will suffice for understanding the invention. While the band B is being paid out from the first band reel $R_1$, for instance, the switching means 7 is to hold the leading end of the new band from the second reel $R_2$ standing by alongside the old band being now consumed. Upon passage of the trailing end of the old band through the switching means 7, the leading end of the new band is to be laterally displaced to the regular band path.

Repositioned on the correct band path as above, the new band is to be fed by the pair of supply rollers RR into the bypass 75 of the gate/guide structure 69 thereby to be guided up to the feed roller 41 of the feed/pullback means 4, bypassing the band pen 6, after the remainder of the old band has been discharged by the rapid withdrawal means 8 in a manner yet to be described. The leading end of the new band is held standing by in that position until a required length of the new band becomes unwound from the second reel $R_2$ and received in the band pen 6. The gate/guide structure 69 has been in the solid-line closed position of FIG. 13 while guiding the new band up to the feed roller 41 as above.

When the leading end of the new band comes up to the feed roller 41, the cylinder 68, FIG. 13, of the gate/guide means 66 will be actuated to cause the gate/guide structure 69 to open the band pen 6. Thereupon, as the pair of supply rollers RR continues to unwind the new band from the second reel $R_2$, the additional length of the band will come off the bypass 75 of the gate/guide structure 69 and enter the band pen 6 therein to be stored in a random zigzag fashion. The supply rollers RR will be automatically set out of rotation when a predetermined length or weight of the new band is received in the band pen 6, as then the weighing bottom 65 of the pen will pivot downwardly to actuate the unshown limit switch.

Rapid Withdrawal Means

At 22 in FIG. 1 is seen a fluid actuated cylinder for turning the part $21_a$ of the guide/holder structure 21 outwardly of the loop when each band reel $R_1$ or $R_2$ is used up. Issuing from the thus turned part $21_a$ of the guide/holder structure 21, the remaining length of the band from the reel $R_1$ or $R_2$ in question is to have its leading end caught between a pair of rapid withdrawal rollers 81 thereby to be rapidly withdrawn from the binding apparatus BN preliminary to switching to the other reel.

Operation

For binding successive stacks S of newspapers or the like by the binding apparatus BN of the foregoing construction, the guide/holder structure 21 of the band looper 2 may be positioned in register with the slot 13 in the platform 1. The band pen 6 may be closed by the gate/guide structure 69 of the gate/guide means 66 by bringing the same to the solid-line closed position of FIG. 13. The bands B from both reels $R_1$ and $R_2$ may be unwound therefrom, and the band from the first reel $R_1$, for example, may be introduced between the pair of supply rollers RR thereby to be fed through the bypass 75 of the gate/guide structure 69 until the leading end of the band becomes engaged between the feed roller 41 and nip roller 43 of the feed/pullback means 4. Then, upon displacement of the gate/guide structure 69 to the phantom open position of FIG. 13, the band subsequently unwound from the reel $R_1$ will be randomly received in the band pen 6.

When the band B is received in the pen 6 to a prescribed weight, the weighing bottom of the pen will turn downward to actuate the unshown limit switch and hence to cause the supply rollers RR to be set out of rotation. The band unwound from the second reel $R_2$ may have its leading end placed in a prescribed position on the switching means 7 and held standing by pending the consumption of the first reel $R_1$ to a predetermined degree.

Then the feed roller 41 may be driven to feed the band B forwardly in cooperation with the nip roller 43 into the guide/holder structure 21 of the band looper 21 along suitable guide means past the tightening roller 51, pullback roller 42, guide hole 31a in the band-leading-end push member 31, and dual guide unit 34. The band B may be fed through the guide/holder structure 21 until, as illustrated in FIG. 3, its leading end comes into overlapping relationship to the trailing part of the band via by the dual guide unit 34. The band B has now been looped larger than the stack and is to be held so pending the arrival of the stack S to be bound.

As the band B is looped as above, the weight of the band being contained in the pen 6 will drop gradually until its bottom 65 is sprung back to the closed position of FIG. 1. The unshown limit switch will then be deactuated to permit the supply rollers RR to be driven again to deliver an additional length of the band into the pen 6 from the reel $R_1$. Also, during the rotation of the feed roller 41 for feeding the band B to the band looper 2, the doctor blade 45 will function to scrape the surface of the feed roller 41 clean of the fusible matter that may have attached thereto as a result of forced contact with the thermoplastic overlay of the fusible paper band B. Such scraping of the feed roller surface is conducive to the prevention of slip from taking place between feed roller and band.

When carried by the delivery conveyor 110 onto the platform 1, the stack S will be detected by any known or suitable detector means, not shown, through the windows 14 in the platform. The detector means will trigger a timer, not shown, and cause both carrying-in conveyor 11 and carrying-out conveyor 12 to be decelerated. Then, upon lapse of a preassigned length of time as measured by the timer, the stack S is to be stopped in position on the platform slot 13.

Figure 4:
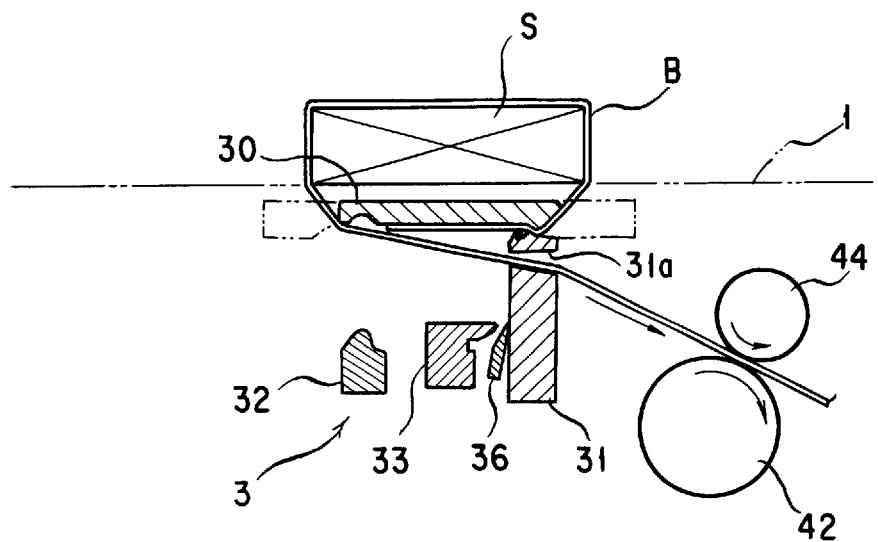
FIG. 4 is an illustration similar to FIG. 3 but showing a second step of binding operation.

Also, upon lapse of the time preset on the unshown timer, the splicer/cutter means 4 will start operating as hereinafter described with reference to FIGS. 4–8. First, as depicted in FIG. 4, the dual guide unit 34 will retract out of register with the platform slot 13, leaving the band in register therewith. Then the band-leading-end push member 31 will be raised to press the band B hard against the abutment 30 in a position spaced upstream from its leading end. Then the pullback roller 42 is to be set in rotation, with the nip roller 44 urged against the same via the band B, to pull back the same, as indicated by the arrows in FIG. 4. Concurrently with such pullback of the band, the guide/holder structure 21 of the band looper 2 will retract out of register with the platform slot 13 thereby releasing the band B. FIG. 4 shows the band B subsequently wrapped around the stack S.

The doctor blade 46, FIG. 1, will function to scrape the surface of the pullback roller 42 during its rotation for pulling back the band B as above, in order to make the roller surface clean of the fusible matter that may have adhered thereto as a result of frictional engagement with the thermoplastic overlay of the paper band. So made clean of the fusible adhesion, the pullback roller 42 will not easily slip under the band while pulling back the same.

Then the tightening roller 51 will rotate, with the nip roller 52 urged against the same via the band B, to tighten the band against the stack S. Then, with the band held tightened, the band-trailing-end push member 32 will be raised to press the band B against the abutment 30 in a position just downstream of the band portion underlying the leading end portion of the band, as illustrated in FIG. 5. Then, as seen also in FIG. 5, the heater 35 is to be inserted between the lapping parts of the band B and held there until the confronting surfaces of the lapping band parts are heated to a temperature required for melting the thermoplastic adhesive.

As has been set forth in conjunction with FIGS. 9 and 10, the heater 35 will be energized by the heater control circuit 37 after such heating of the thermoplastic adhesive, for a longer period of time than each of the periods during which it is normally heated at intervals, in order to be recovered from a temperature drop in the course of the heating. The heater 35 will be thus swiftly recovered from an undesired temperature drop and maintained in a desired temperature range for melting the adhesive.

In FIG. 6 are shown both band-lapping-parts push member 33 and cutter 36 raised to positions just short of their topmost positions before withdrawal of the heater 35 from between the lapping parts of the band B. Then, immediately upon heater withdrawal as in FIG. 7, the push member 33 will push the lapping parts of the band against the abutment 33 until the fused adhesive solidifies to create a fused joint. The cutter 36 will cut the band B in coaction with the band-leading-end push member 31 in a position just upstream of the fused joint.

Following the band severance by the cutter 36, the abutment 30 will retract out of register with the platform slot 13. The push members 31–33 and cutter 36 will also retract away from the bound stack S, as shown in FIG. 8. The carrying-in conveyor 11 and carrying-out conveyor 12, FIG. 2, will both operate to carry the bound stack S off the platform 1 and onto the downstream delivery conveyor 120.

One cycle of binding operation has now been completed. The next cycle will start as the abutment 30, dual guide unit 34, and guide/holder structure all travel back will move back to their working positions.

A switching from the first $R_1$ to the second $R_2$ band reel becomes necessary when the first reel is used up by the repetition of the foregoing cycle of operation. The switching means 7 have a sensor, not shown, for sensing the trailing end of the band. Upon detection of the trailing end of the band from the first reel $R_1$, the switching means 7 will cause lateral displacement of the leading end of the band from the second reel $R_2$ to the band path leading to the band looper 2. Then, following the completion of stack binding by the band that has been held by the guide/holder structure 21 at that juncture, the actuator 22 of the rapid withdrawal means 8 will operate to turn the part $21_a$ of the structure 21 toward the pair of band withdrawal rollers 81. Driven by the feed roller 41 and nip roller 43, the remaining length of the band from the first reel $R_1$ will then travel into the guide/holder structure 21 and, guided by its part $21_a$, be caught between the pair of band withdrawal rollers 81 thereby to be rapidly withdrawn from the binding apparatus BN.

During such rapid band withdrawal, as has been set forth with reference to FIG. 12, the nozzle 54 is to emit a stream of air under pressure to cause the band to fly, so to say, over the tightening roller 51, the latter being rotatable only in the direction for tightening the band. The airstream will, to say the least, greatly mitigate the frictional retardation of the band by the tightening roller 51. The band pen 6 may be closed by the gate/guide means 66 upon withdrawal of the remaining band from the guide/holder structure 21.

Now comes the step of threading the new band from the second reel $R_2$ through the binding apparatus BN. This new band will be driven by the supply rollers RR into the bypass 75, FIG. 14, in the gate/guide structure 69 thereby to be guided up to the feed roller 41. This feed roller will then coact with the nip roller 43 to drive the new band along the predefined path past the tightening roller 51 and pullback roller 42. Then the new band will enter the guide/holder structure 21 via the band leading end push member 31 and dual guide unit 34 and, after being looped larger than the stack 1, come into overlapping relationship to its part via the dual guide unit as in FIG. 3. The new band is now ready to bind the next stack S delivered onto the platform 1.

After guiding the leading end of the new band up into engagement between feed roller 41 and nip roller 43 as above, the gate/guide structure 69 will open the band pen 6 thereby causing the subsequently supplied length of the band to be received meanderingly therein. The delivery of the new band into the pen 6 will come to an end upon pivotal displacement of its weighing bottom 65.

Upon completion of switching to the new band reel $R_2$, the old reel $R_1$ may be dismounted from the binding apparatus BN, and an unused band reel mounted in its stead. Then the leading end of the band from this unused reel may be set in position on the switching means 7.

Delivery System

Figure 15:
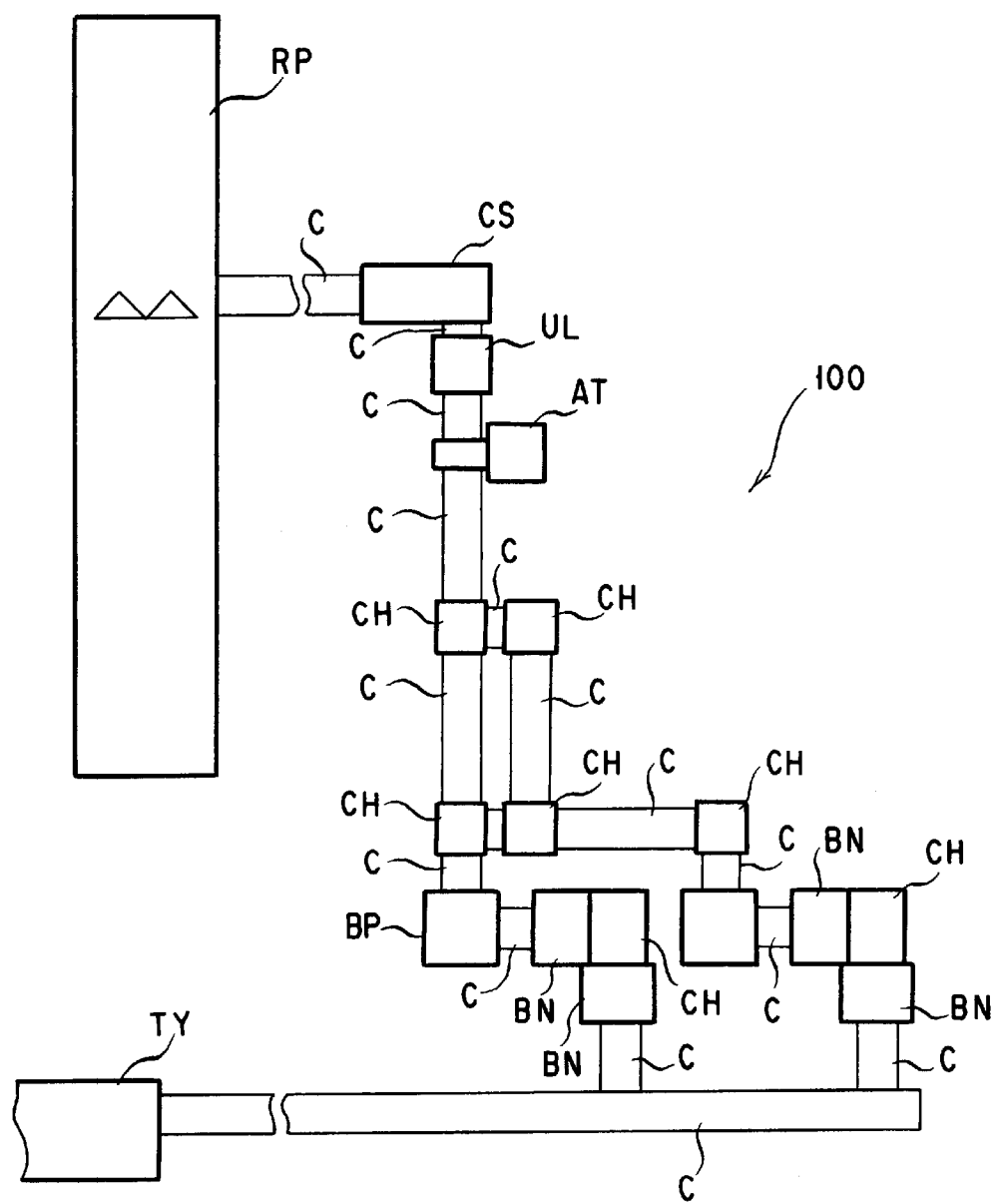
FIG. 15 is a diagrammatic illustration of a delivery system for a rotary printing press, the delivery system having binding stations each constructed as in FIG. 1.

The binding apparatus of the foregoing construction and operation lends itself to use at each of several binding stations of a delivery system for newspapers or like printings shown diagrammatically in FIG. 15. Generally designated 100 in this figure, the delivery system is shown appended to a rotary printing press RP for stacking, binding and packaging the printings while they are conveyed therefrom to a place of shipment such as a truck yard TY.

Referring more specifically to FIG. 15, the delivery system 100 comprises a stacking station CS for stacking each prescribed number of printings, an underlaying station UL for underlaying each stack of printings with a protective sheet, an addressing station AT for attaching an address tag to the top of each stack, packaging stations BP for packaging each stack, and binding stations BN each constructed as in FIG. 1. Conveyors C, including those shown at 110 and 120 in FIG. 2, are provided for carrying the loads from station to station. Seen at CH are direction changes for changing the traveling directions of the loads being transported by the conveyors C.

On issuing from the printing press RP, the printings are counted and stacked at the stacking station CS until the predetermined count is reached each time. The successive stacks of printings are then provided with protective underlays at the underlaying station UL, then have address tags attached at the addressing station AT, then are packaged at the packaging stations BP, and then bound at the binding stations BN, before they arrive at the truck yard TY.

As has been set forth in connection with FIGS. 9 and 10, the heater 35, FIGS. 5 and 6, at each binding station BN is energized cyclically during the operation of the apparatus which includes a stand-by state pending the arrival of each stack and so kept ready for creation of a fused joint for the band. After the band fusion signal is output to command the heating of the band that has been wrapped around the stack, the heater will be energized for a longer period of time in order to be recovered from a temperature drop as a result of the heating of the band. The heater will be cyclically heated again after it has completed the creation of a fused joint and kept ready for the band on the next stack.

Thus the successive stacks of printings will be efficiently bound at each binding station BN. The stacks may therefore be delivered to each truck yard TY at a higher rate than if no such temperature control of the band heater according to the invention is effected.

What is claimed is:

1. An apparatus for binding a succession of stacked loads with a thermally fusible band, the binding apparatus comprising:
    (a) means for supplying a continuous length of thermally fusible band;
    (b) means for looping the band around a load so as to provide lapping parts of the band;
    (c) means for tightening the looped band against the load;
    (d) a band heater for heating the lapping parts of the tightened band and hence for uniting the same into a fused joint;
    (e) means for cutting the band that has been bound around the load, off from its continuous supply; and
    (f) heater control means for causing the band heater to be normally energized for a first preassigned period of time at constant intervals during the operation of the apparatus and for causing the band heater to be energized at least for a second preassigned period of time, which is longer than the first preassigned period time, in response to the heating of the band around each load, after the fusion jointing, in order to compensate for a temperature drop that might occur as a result of heating the band.

2. The binding apparatus of claim 1 wherein the heater control means comprises:
    (a) first timer means for providing an output indicative of the first preassigned period of time at the constant intervals;
    (b) second timer means for providing an output indicative of the second preassigned period of time in response to a band fusion signal commanding the band heater to heat the lapping parts of the band into a fused joint; and
    (c) gate means connected to the first and the second timer means for providing an output for causing the band heater to be normally periodically energized for the first preassigned period of time and, in response to the band fusion signal, after the fusion jointing, at least for the second preassigned period of time.

3. The binding apparatus of claim 2 wherein the output from the gate means of the heater control means causes the band heater to be energized, in response to the band fusion signal, for a variable length of time which is longer than the second preassigned period of time and not longer than the sum of the first and the second preassigned period of time.

4. An apparatus for binding a succession of stacked loads with a thermally fusible band, the binding apparatus comprising:
    (a) a platform;
    (b) conveyor means for carrying successive loads onto the platform, one at a time, and, following the binding of each load thereon, for carrying the bound load away therefrom;
    (c) band supply means for supplying a continuous length of thermally fusible band;
    (d) band looper means for loosely looping and releasably holding the band around a load on the platform so as to provide lapping parts of the band with a spacing therebetween;
    (e) feed means for feeding the band from the band supply means to the band looper means;
    (f) pullback means for pulling back the band that has been loosely looped around the load and which has been released from the band looper means;
    (g) tightening means for tightening the band against the load;
    (h) a band heater moveable into and out of the spacing between the lapping parts of the tightened band and hence for thermally uniting the lapping parts into a fused joint;
    (i) cutter means for cutting the band that has been bound around each load, off from its continuous length from the band supply means; and
    (j) heater control means for causing the band heater to be normally energized for a first preassigned period of time at constant intervals during the operation of the apparatus and for causing the band heater to be energized at least for a second preassigned period of time, which is longer than the first preassigned period time, in response to a band fusion signal commanding the travel of the band heater into and out of the spacing between the lapping parts of the tightened band, after the fusion jointing, in order to compensate for a temperature drop that might occur as a result of heating the band.

5. The binding apparatus of claim 4 wherein the heater control means comprises:
    (a) first timer means for providing an output indicative of the first preassigned period of time at the constant intervals;
    (b) second timer means for providing an output indicative of the second preassigned period of time in response to a band fusion signal commanding the band heater to heat the lapping parts of the band into a fused joint; and
    (c) gate means connected to the first and the second timer means for providing an output for causing the band heater to be normally periodically energized for the first preassigned period of time and, in response to the band fusion signal, after the fusion jointing, at least for the second preassigned period of time.

6. The binding apparatus of claim 5 wherein the output from the gate means of the heater control means causes the band heater to be energized, in response to the band fusion signal, after the fusion jointing, for a variable length of time which is longer than the second preassigned period of time and not longer than the sum of the first and the second preassigned period of time.

7. The binding apparatus of claim 4 wherein the feed means comprises:
    (a) a feed roller; and
    (b) means for scraping the feed roller clean of thermally fusible matter that may adhere to the feed roller from the thermally fusible band.

8. The binding apparatus of claim 4 wherein the pullback means comprises:
    (a) a pullback roller; and
    (b) means for scraping the pullback roller clean of thermally fusible matter that may adhere to the pullback roller from the thermally fusible band.

9. The binding apparatus of claim 4 further comprising:
    (a) a band pen disposed adjacent the band supply means and the feed means for temporarily storing the thermally fusible band before being fed to the band looper means; and
    (b) measuring means for measuring an amount of the thermally fusible band being introduced into the band pen in order to keep the same filled with an approximately prescribed length of the thermally fusible band from the band supply means.

10. The binding apparatus of claim 9 wherein the measuring means comprising a weighing bottom mounted to the band pen for pivotal displacement when weighed by the approximately prescribed length of the thermally fusible band received in the band pen.

11. The binding apparatus of claim 9 wherein the band pen has an opening for receiving the band from the band supply means, and wherein the binding apparatus further comprises gate/guide means capable of opening and closing the opening in the band pen, the gate/guide means when closing the opening providing a bypass for the band to travel directly from the band supply means to the feed means.

12. The binding apparatus of claim 4 further comprising:
   (a) switching means for switching the thermally fusible band from one band reel to another being held at the band supply means; and
   (b) rapid withdrawal means for rapidly withdrawing a remaining length of the band from the binding apparatus preparatory to the switching from one band reel to another.

13. The binding apparatus of claim 12 wherein the tightening means comprises:
   (a) a tightening roller; and
   (b) air blow means for applying a forced stream of air to the tightening roller in order to lessen frictional contact thereof with the remaining length of the band being rapidly withdrawn from the binding apparatus.

14. A delivery system having conveyor means for transporting a succession of loads from a location where the loads are made to a location of shipment through at least one binding station, the binding station comprising:
   (a) means for supplying a continuous length of thermally fusible band;
   (b) means for looping the band around each of the successive loads so as to provide lapping parts of the band;
   (c) means for tightening the looped band against the load;
   (d) a band heater for heating the lapping parts of the tightened band and hence for uniting the same into a fused joint;
   (e) means for cutting the band that has been bound around the load, off from its continuous supply; and
   (f) heater control means for causing the band heater to be normally energized for a first preassigned period of time at constant intervals during the operation of the apparatus, and for causing the band heater to be energized at least for a second preassigned period of time, which is longer than the first preassigned period of time, in response to the heating of the band around each load, after the fusion jointing, in order to compensate for a temperature drop that might occur as a result of heating the band.

15. The delivery system of claim 14 wherein the heater control means of the binding station comprises:
   (a) first timer means for providing an output indicative of the first preassigned period of time at the constant intervals;
   (b) second timer means for providing an output indicative of the second preassigned period of time in response to a band fusion signal commanding the band heater to heat the lapping parts of the band into a fused joint; and
   (c) gate means connected to the first and the second timer means for providing an output for causing the band heater to be normally periodically energized for the first preassigned period of time and, in response to the band fusion signal, after the fusion jointing, at least for the second preassigned period of time.

16. A delivery system having conveyor means for transporting a succession of stacked loads where the loads are made to a place of shipment such as a truck yard through at least one binding station, the binding station comprising:
   (a) a platform;
   (b) conveyor means for loading the successive loads onto the platform, one at a time, and, following the binding of each load thereon, for carrying the bound load away from the platform;
   (c) band supply means for supplying a continuous length of thermally fusible band;
   (d) band looper means for loosely looping and releasably holding the band around the load on the platform so as to provide lapping parts of the band with a spacing therebetween;
   (e) feed means for feeding the band from the band supply means to the band looper means;
   (f) pullback means for pulling back the band that has been loosely looped around the load and which has been released from the band looper means;
   (g) tightening means for tightening the band against the load;
   (h) a band heater moveable into and out of the spacing between the lapping parts of the tightened band and hence for thermally uniting the lapping parts into a fused joint;
   (i) a cutter for cutting the band that has been bound around each load, off from its continuous length from the band supply means; and
   (j) heater control means for causing the band heater to be normally energized for a first preassigned period of time at constant intervals during the operation of the apparatus and, upon travel of the band heater out of the spacing between the lapping parts of the tightened band on each load, at least for a second preassigned period of time which is longer than the first preassigned period time, in order to compensate for a temperature drop that might occur as a result of heating the band.

17. A delivery system as claimed in claim 16, characterized in that a stacking station is provided upstream of the binding station for stacking each predetermined number of printings issuing from the printing press and for delivering the successive stacks as the loads to the binding station.

* * * * *